US012565611B2

(12) United States Patent
Lee et al.

(10) Patent No.: US 12,565,611 B2
(45) Date of Patent: Mar. 3, 2026

(54) ROHS COMPLIANT MIXED QUANTUM DOT FILMS

(71) Applicant: Shoei Chemical Inc., Tokyo (JP)

(72) Inventors: Ernest Lee, Palo Alto, CA (US); ZhongSheng Luo, San Jose, CA (US)

(73) Assignee: SHOEI CHEMICAL INC., Tokyo (JP)

( * ) Notice: Subject to any disclaimer, the term of this patent is extended or adjusted under 35 U.S.C. 154(b) by 859 days.

(21) Appl. No.: 17/858,238

(22) Filed: Jul. 6, 2022

(65) Prior Publication Data

US 2022/0411691 A1      Dec. 29, 2022

Related U.S. Application Data

(63) Continuation of application No. PCT/US2021/012252, filed on Jan. 6, 2021.

(60) Provisional application No. 62/957,419, filed on Jan. 6, 2020.

(51) Int. Cl.
| | |
|---|---|
| *C09K 11/02* | (2006.01) |
| *C09K 11/08* | (2006.01) |
| *C09K 11/88* | (2006.01) |
| *B82Y 20/00* | (2011.01) |

(52) U.S. Cl.
CPC .......... *C09K 11/02* (2013.01); *C09K 11/0883* (2013.01); *C09K 11/883* (2013.01); *B82Y 20/00* (2013.01)

(58) Field of Classification Search
None
See application file for complete search history.

(56) References Cited

U.S. PATENT DOCUMENTS

| | | | |
|---|---|---|---|
| 2011/0089809 A1 | 4/2011 | Hoon et al. | |
| 2012/0113672 A1* | 5/2012 | Dubrow ............... | G02B 6/0055 |
| | | | 977/774 |
| 2016/0351843 A1 | 12/2016 | Yang et al. | |

| | | | |
|---|---|---|---|
| 2017/0037314 A1 | 2/2017 | Ki et al. | |
| 2017/0250322 A1 | 8/2017 | Wang et al. | |
| 2018/0202616 A1 | 7/2018 | Seon-Tae et al. | |

FOREIGN PATENT DOCUMENTS

| | | | |
|---|---|---|---|
| CN | 108666404 A | | 10/2018 |
| TW | 201730645 A | * | 9/2017 |
| TW | 201800555 A | * | 1/2018 |
| WO | WO 2008/013780 A2 | * | 1/2008 |

OTHER PUBLICATIONS

Wang et al., "Bright, efficient, and color-stable violet ZnSe-based quantum dot light-emitting diodes," Nanoscale 7:2951-2959 (2015).
Chibli et al., "Cytotoxicity of InP/ZnS quantum dots related to reactive oxygen species generation," Nanoscale 3:2552-2559 (2011).
Blackburn et al., "Electron and Hole Transfer from Indium Phosphide Quantum Dots," J. Phys. Chem. B 109:2625-2631 (2005).
Selmarten et al., "Quenching of Semiconductor Quantum Dot Photoluminescence by a π-Conjugated Polymer," J. Phys. Chem. B 109:15927-15933 (2005).
Ziegler et al., "Silica-Coated InP/ZnS Nanocrystals as Converter Material in White LEDs," Adv. Mater. 20:4068-4073 (2008).
Jo et al., "Photostability enhancement of InP/ZnS quantum dots enabled by In2O3 overcoating," J. Alloys Compd. 647:6-13 (2015).
Li et al., "Large-Scale Synthesis of Nearly Monodisperse CdSe/CdS Core/Shell Nanocrystals Using Air-Stable Reagents via Successive Ion Layer Adsorption and Reaction," J. Am. Chem. Soc. 125:12567-12575 (2003).
Ithurria et al., "Colloidal Atomic Layer Deposition (c-ALD) using Self-Limiting Reactions at Nanocrystal Surface Coupled to Phase Transfer between Polar and Nonpolar Media," J. Am. Chem. Soc. 134:18585-18590 (2012).
Xu et al., "Rapid synthesis of highly luminescent InP and InP/ZnS nanocrystals," J. Mater. Chem. 18:2653-2656 (2008).
International Search Report and Written Opinion for PCT/US2021/012252 mailed Mar. 26, 2021, 8 pages.

* cited by examiner

*Primary Examiner* — Tae H Yoon
(74) *Attorney, Agent, or Firm* — Alleman Hall LLP

(57) ABSTRACT

ROSH compliant mixed quantum dot films are disclosed which, when contained in a film within a display, exhibit high color gamut, high energy efficiency, and a narrow full width at half maximum at individual wavelength emissions.

20 Claims, 2 Drawing Sheets

ROHS COMPLIANT MIXED QUANTUM DOT FILMS

BACKGROUND OF THE INVENTION

Field of the Invention

The invention is in the field of nanotechnology. Low concentration cadmium-containing quantum dot compositions are disclosed which, when in a film within a display, exhibit high color gamut, high energy efficiency, and a narrow full width at half maximum at individual wavelength emissions.

Background Art

Semiconductor nanostructures can be incorporated into a variety of electronic and optical devices. The electrical and optical properties of such nanostructures vary, e.g., depending on their composition, shape, and size. For example, size-tunable properties of semiconductor nanoparticles are of great interest for applications such as light emitting diodes (LEDs), lasers, and biomedical labeling. Highly luminescent nanostructures are particularly desirable for such applications.

To exploit the full potential of nanostructures in applications such as LEDs and displays, the nanostructures need to simultaneously meet five criteria: narrow and symmetric emission spectra, high photoluminescence (PL) quantum yields (QYs), high optical stability, eco-friendly materials, and low-cost methods for mass production. Most previous studies on highly emissive and color-tunable quantum dots have concentrated on materials containing cadmium, mercury, or lead. Wang, A., et al., *Nanoscale* 7:2951-2959 (2015). But, there are increasing concerns that toxic materials such as cadmium, mercury, and lead pose serious threats to human health and the environment. The European Union's Restriction of Hazardous Substances rules ban any consumer electronics containing more than trace amounts of these materials. Therefore, there is a need to produce materials that contain no more than trace amounts of cadmium, mercury, and lead for the production of LEDs and displays.

Cadmium-free quantum dots based on indium phosphide are inherently less stable than the prototypic cadmium selenide quantum dots. The higher valence and conduction band energy levels make InP quantum dots more susceptible to photooxidation by electron transfer from an excited quantum dot to oxygen, as well as more susceptible to photoluminescence quenching by electron-donating agents such as amines or thiols which can refill the hole states of excited quantum dots and thus suppress radiative recombination of excitons. See, e.g., Chibli, H., et al., "Cytotoxicity of InP/ZnS quantum dots related to reactive oxygen species generation," *Nanoscale* 3:2552-2559 (2011); Blackburn, J. L., et al., "Electron and Hole Transfer from Indium Phosphide Quantum Dots," *J. Phys. Chem. B* 109:2625-2631 (2005); and Selmarten, D., et al., "Quenching of Semiconductor Quantum Dot Photoluminescence by a π-Conjugated Polymer," *J. Phys. Chem. B* 109:15927-15933 (2005).

Inorganic shell coatings on quantum dots are a universal approach to tailoring their electronic structure. Additionally, deposition of an inorganic shell can produce more robust particles by passivation of surface defects. Ziegler, J., et al., *Adv. Mater.* 20:4068-4073 (2008). For example, shells of wider band gap semiconductor materials such as ZnS can be deposited on a core with a narrower band gap—such as CdSe or InP—to afford structures in which excitons are confined within the core. This approach increases the probability of radiative recombination and makes it possible to synthesize very efficient quantum dots with quantum yields close to unity and thin shell coatings.

Core/shell quantum dots that have a shell of a wider band gap semiconductor material deposited onto a core with a narrower band gap are still prone to degradation mechanisms—because a thin shell of less than a nanometer does not sufficiently suppress charge transfer to environmental agents. A thick shell coating of several nanometers would reduce the probability of tunneling or exciton transfer and thus, it is believed that a thick shell coating would improve stability—a finding that has been demonstrated for the CdSe/CdS system.

Regardless of the composition of quantum dots, most quantum dots do not retain their originally high quantum yield after continuous exposure to excitation photons. Elaborate shelling engineering such as the formation of multiple shells and thick shells wherein the carrier wave functions in the core become distant from the surface of the quantum dot—have been effective in mitigating the photoinduced quantum dot deterioration. Furthermore, it has been found that the photodegradation of quantum dots can be retarded by encasing them with an oxide—physically isolating the quantum dot surface from their environment. Jo, J.-H., et al., *J. Alloys Compd.* 647:6-13 (2015).

Thick coatings on CdSe/CdS giant shell quantum dots have been found to improve their stability towards environmental agents and surface charges by decoupling the light-emitting core from the surface over several nanometers. But, it is difficult to retain the beneficial properties of thin shell quantum dots when producing thick shells due to the manifold opportunities for failure and degradation such as: (1) dot precipitation due to increased mass, reduced surface-to-volume ratio, and increased total surface area; (2) irreversible aggregation with shell material bridging dots; (3) secondary nucleation of shell material; (4) relaxation of lattice strain resulting in interface defects; (5) anisotropic shell growth on preferred facets; (6) amorphous shell or non-epitaxial interface; and (7) a broadening of size distribution resulting in a broad emission peak.

The interfaces in these heterogeneous nanostructures need to be free of defects because defects act as trap sites for charge carriers and result in a deterioration of both luminescence efficiency and stability. Due to the naturally different lattice spacings of these semiconductor materials, the crystal lattices at the interface will be strained. The energy burden of this strain is compensated by the favorable epitaxial alignment of thin layers, but for thicker layers the shell material relaxes to its natural lattice—creating misalignment and defects at the interface. There is an inherent tradeoff between adding more shell material and maintaining the quality of the material.

Recent advances have made it possible to obtain highly luminescent plain core nanocrystals. But, the synthesis of these plain core nanocrystals has shown stability and processibility problems and it is likely that these problems may be intrinsic to plain core nanocrystals. Thus, core/shell nanocrystals are preferred when the nanocrystals must undergo complicated chemical treatments—such as for biomedical applications—or when the nanocrystals require constant excitation as with LEDs and lasers. See Li, J. J., et al., *J. Am. Chem. Soc.* 125:12567-12575 (2003).

There are two critical issues that must be considered to control the size distribution during the growth of shell materials: (1) the elimination of the homogenous nucleation of the shell materials; and (2) homogenous monolayer growth of shell precursors to all core nanocrystals in solution to yield shells with equal thickness around each core nanocrystal. Successive ion layer adsorption and reaction (SILAR) was originally developed for the deposition of thin films on solid substrates from solution baths and has been introduced as a technique for the growth of high-quality core/shell nanocrystals of compound semiconductors.

CdSe/CdS core/shell nanocrystals have been prepared with photoluminescence quantum yields of 20-40% using the SILAR method. Li, J. J., et al., *J. Am. Chem. Soc.* 125:12567-12575 (2003). In the SILAR process, the amount of the precursors used for each half-reaction are calculated to match one monolayer coverage for all cores—a technique that requires precise knowledge regarding the surface area for all cores present in the reaction mixture. And, the SILAR process assumes quantitative reaction yields for both half-reactions and thus, inaccuracies in measurements accumulate after each cycle and lead to a lack of control.

The colloidal atomic layer deposition (c-ALD) process was proposed in Ithurria, S., et al., *J. Am. Chem. Soc.* 134:18585-18590 (2012) for the synthesis of colloidal nanostructures. In the c-ALD process, either nanoparticles or molecular precursors are sequentially transferred between polar and nonpolar phases to prevent unreacted precursors and byproducts from accumulating in the reaction mixture. The c-ALD process has been used to grow CdS layers on colloidal CdSe nanocrystals, CdSe nanoplatelets, and CdS nanorods. But, the c-ALD process suffers from the need to use phase transfer protocols that introduce exposure to potentially detrimental highly polar solvents such as formamide and N-methyl-formamide hydrazine.

A need exists for quantum dot compositions with low levels of Cd and high color gamut. The present invention provides such compositions that are useful in films, e.g. for display devices.

BRIEF SUMMARY OF THE INVENTION

The invention provides an optical film useful in a display device comprising at least one first population of cadmium-containing core-shell nanostructures and at least one second population of core-shell nanostructures that are not cadmium-containing core-shell nanostructures in a common matrix material, wherein the peak emission wavelengths of the first and second populations are about the same, and further comprising a third population of nanostructures with a different peak emission wavelength. In one embodiment, the optical film is substantially free of cadmium. In another embodiment, the optical film contains 10 to 99 ppm of cadmium. In another embodiment, the at least one second population of nanostructures has a core selected from the group consisting of ZnO, ZnSe, ZnS, ZnTe, HgO, HgSe, HgS, HgTe, BN, BP, BAs, AlP, AlAs, AlSb, GaN, GaP, GaAs, GaSb, InN, InP, InAs, InSb, perovskite, and $CuIn_xGa_{1-x}S_ySe_{2-y}$. In another embodiment, the at least one second population of nanostructures has an InP core. In another embodiment, the shell for each population is selected from the group consisting of Group III-V elements and oxides thereof. In another embodiment, the first population of core-shell nanostructures are CdSe/ZnSe/ZnS and the at least one second population of shell/core-nanostructures are InP/ZnSe/ZnS. In one embodiment, the emission spectra of each core-shell nanostructure has a FWHM of 10-50 nm. In another embodiment, the optical film, when in a display device, is capable of achieving a Rec.2020 coverage of about 72% to about 98%. In another embodiment, the display device is capable of achieving a Rec.2020 coverage of greater than about 90%. In another embodiment, the optical film comprises a first population of cadmium-containing core-shell nanostructures with a FWHM of about 20-40 nm, and a quantum yield of greater than about 90%. In another embodiment, the optical film comprises a second population of non-cadmium-containing core-shell nanostructures with a FWHM of about 20-45 nm, and a quantum yield of greater than about 75%. In one embodiment, the peak emission wavelengths of the first and second populations are the same. In another embodiment, the peak emission wavelength of the third population is different than the peak emission wavelengths of the first and second populations.

In some embodiments, the first population of cadmium-containing nanostructures are CdSe nanostructures and the second population of non-cadmium-containing nanostructures are InP nanostructures. In another embodiment, the third population of nanostructures are either CdSe or InP nanostructures.

In some embodiments, the peak emission wavelengths of the first and second population nanostructures are at about 539 nm, and the third at about 639 nm. In another embodiment, the peak emission wavelengths of the first and second population nanostructures are at about 639 nm, and the third at about 539 nm.

In some embodiments, the nanostructures are quantum dots.

In some embodiments, the nanostructures further comprises a matrix material. In some embodiments, the matrix material comprises thiol-functionalized or polythiol-functionalized polymers.

The nanostructures further comprise a ligand bound thereto. In one embodiment, the ligand is a carboxylate ligand. In another embodiment, the ligand is a fatty acid. In another embodiment, the fatty acid is oleic acid, lauric acid, or methoxy ethoxy acetic acid. In another embodiment, the carboxylate ligand is zinc carboxylate. In another embodiment, the zinc carboxylate is a zinc salt of oleic acid, lauric acid, or methoxy ethoxy acetic acid.

The invention also provides a display device, comprising the optical film described herein. In one embodiment, the display has a Rec.2020 coverage of about 80% to about 98%. In one embodiment, the Rec.2020 coverage is about 90%-about 98%.

In another embodiment, the display device comprises:
a layer that emits radiation;
the optical film layer disposed on the radiation emitting layer;
an optically transparent barrier layer on the film layer; and
an optical element, disposed on the barrier layer.

In some embodiments, the radiation emitting layer, the film layer, and the optical element are part of a pixel unit of the display device. In another embodiment, the optical element is a color filter. In another embodiment, the barrier layer comprises an oxide. In another embodiment, the optically transparent barrier layer is configured to protect the nanostructures from degradation by light flux, heat, oxygen, moisture, or a combination thereof.

Figure 2:
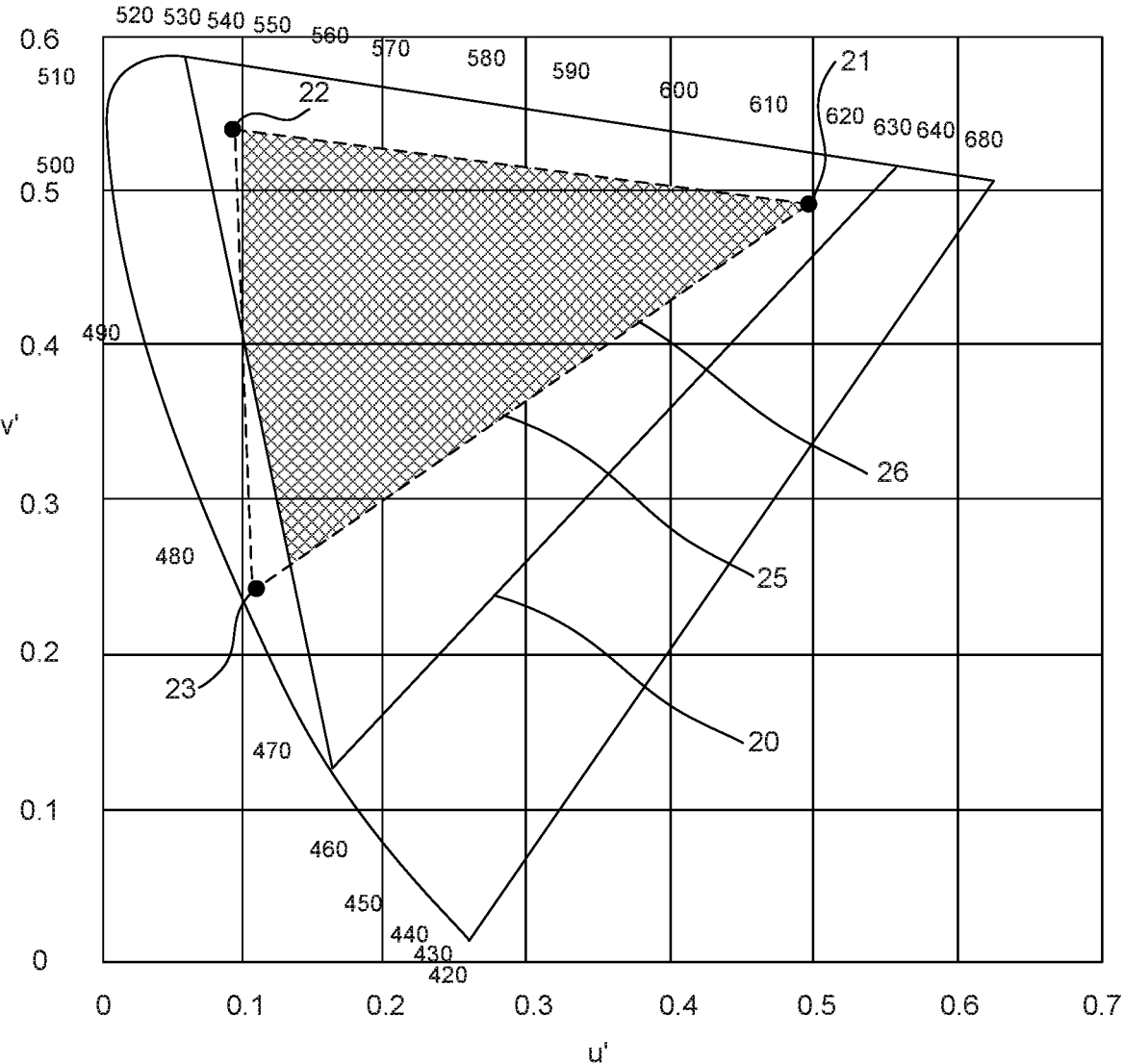

FIG. 2 is a diagram that illustrates the concept of "gamut coverage" using the Rec.2020 color gamut in 1976 CIE(u', v') color space.

DETAILED DESCRIPTION OF THE INVENTION

Definitions

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by ±10% of the value. For example, "about 100 nm" encompasses a range of sizes from 90 nm to 110 nm, inclusive. In connection with a peak emission wavelength, the term "about" indicates that the wavelength varies by ±10 nm. For example, a peak emission wavelength of about 350 nm encompasses a range of sizes from 340 nm to 360 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm. In other embodiments, each of the dimensions of the nanocrystal has a dimension of less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

As used herein, "RoHS compliant" optical films refers to optical films with less than 1000 ppm of lead (Pb), less than 100 ppm cadmium (Cd), less than 100 ppm mercury (Hg), less than 1000 ppm hexavalent chromium (Hex-Cr), less than 1000 ppm polybrominated biphenyls (PBB), and less than 1000 ppm polybrominated diphenyl ethers (PBDE). The Restriction of Hazardous substances (RoHS) directive aims to restrict certain dangerous substances commonly used in electrical and electronic equipment. RoHS compliant components are tested for the presence of cadmium and hexavalent chromium, there must be less than 0.01% of the substance by weight at the raw homogeneous materials level. For lead, PBB, and PBDE, there must be no more than 0.1% of the material, when calculated by weight at raw homogeneous materials. Any RoHS compliant component must have 100 ppm or less of mercury and the mercury must not have been intentionally added to the component. In the EU, some military and medical equipment are exempt from RoHS compliance.

A "ligand" is a molecule capable of interacting (whether weakly or strongly) with one or more faces of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from TEM images of nanocrystals before and after a shell synthesis.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

"Alkyl" as used herein refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

Unless clearly indicated otherwise, ranges listed herein are inclusive.

A variety of additional terms are defined or otherwise characterized herein.

Production of a Core

Methods for colloidal synthesis of a variety of nanostructures are known in the art. Such methods include techniques for controlling nanostructure growth, e.g., to control the size and/or shape distribution of the resulting nanostructures.

In a typical colloidal synthesis, semiconductor nanostructures are produced by rapidly injecting precursors that undergo pyrolysis into a hot solution (e.g., hot solvent and/or surfactant). The precursors can be injected simultaneously or sequentially. The precursors rapidly react to form nuclei. Nanostructure growth occurs through monomer addition to the nuclei, typically at a growth temperature that is lower than the injection/nucleation temperature.

Ligands interact with the surface of the nanostructure. At the growth temperature, the ligands rapidly adsorb and desorb from the nanostructure surface, permitting the addition and/or removal of atoms from the nanostructure while suppressing aggregation of the growing nanostructures. In general, a ligand that coordinates weakly to the nanostructure surface permits rapid growth of the nanostructure, while a ligand that binds more strongly to the nanostructure surface results in slower nanostructure growth. The ligand can also interact with one (or more) of the precursors to slow nanostructure growth.

Nanostructure growth in the presence of a single ligand typically results in spherical nanostructures. Using a mixture of two or more ligands, however, permits growth to be controlled such that non-spherical nanostructures can be produced, if, for example, the two (or more) ligands adsorb differently to different crystallographic faces of the growing nanostructure.

A number of parameters are thus known to affect nanostructure growth and can be manipulated, independently or in combination, to control the size and/or shape distribution of the resulting nanostructures. These include, e.g., temperature (nucleation and/or growth), precursor composition, time-dependent precursor concentration, ratio of the precursors to each other, surfactant composition, number of surfactants, and ratio of surfactant(s) to each other and/or to the precursors.

The synthesis of Group III-VI nanostructures has been described in U.S. Pat. Nos. 6,225,198, 6,322,901, 6,207,229, 6,607,829, 7,060,243, 7,374,824, 6,861,155, 7,125,605, 7,566,476, 8,158,193, and 8,101,234 and in U.S. Patent Appl. Publication Nos. 2011/0262752 and 2011/0263062. The synthesis of Group II-V nanostructures has been described in U.S. Pat. Nos. 5,505,928, 6,306,736, 6,576,291, 6,788,453, 6,821,337, and 7,138,098, 7,557,028, 8,062,967, 7,645,397, and 8,282,412 and in U.S. Patent Appl. Publication No. 2015/236195.

The synthesis of Group II-V nanostructures has also been described in Wells, R. L., et al., "The use of tris(trimethylsilyl)arsine to prepare gallium arsenide and indium arsenide," *Chem. Mater.* 1:4-6 (1989) and in Guzelian, A. A., et al., "Colloidal chemical synthesis and characterization of InAs nanocrystal quantum dots," *Appl. Phys. Lett.* 69: 1432-1434 (1996).

Synthesis of InP-based nanostructures has been described, e.g., in Xie, R., et al., "Colloidal InP nanocrystals as efficient emitters covering blue to near-infrared," *J. Am. Chem. Soc.* 129:15432-15433 (2007); Micic, O. I., et al., "Core-shell quantum dots of lattice-matched $ZnCdSe_2$ shells on InP cores: Experiment and theory," *J. Phys. Chem. B* 104:12149-12156 (2000); Liu, Z., et al., "Coreduction colloidal synthesis of II-V nanocrystals: The case of InP," *Angew. Chem. Int. Ed. Engl.* 47:3540-3542 (2008); Li, L. et al., "Economic synthesis of high quality InP nanocrystals using calcium phosphide as the phosphorus precursor," *Chem. Mater.* 20:2621-2623 (2008); D. Battaglia and X. Peng, "Formation of high quality InP and InAs nanocrystals in a noncoordinating solvent," *Nano Letters* 2:1027-1030 (2002); Kim, S., et al., "Highly luminescent InP/GaP/ZnS nanocrystals and their application to white light-emitting diodes," *J. Am. Chem. Soc.* 134:3804-3809 (2012); Nann, T., et al., "Water splitting by visible light: A nanophotocathode for hydrogen production," *Angew. Chem. Int. Ed.* 49:1574-1577 (2010); Borchert, H., et al., "Investigation of ZnS passivated InP nanocrystals by XPS," *Nano Letters* 2:151-154 (2002); L. Li and P. Reiss, "One-pot synthesis of highly luminescent InP/ZnS nanocrystals without precursor injection," *J. Am. Chem. Soc.* 130:11588-11589 (2008); Hussain, S., et al. "One-pot fabrication of high-quality InP/ZnS (core/shell) quantum dots and their application to cellular imaging," *Chemphyschem.* 10:1466-1470 (2009); Xu, S., et al., "Rapid synthesis of high-quality InP nanocrystals," *J. Am. Chem. Soc.* 128:1054-1055 (2006); Micic, O. I., et al., "Size-dependent spectroscopy of InP quantum dots," *J. Phys. Chem. B* 101:4904-4912 (1997); Haubold, S., et al., "Strongly luminescent InP/ZnS core-shell nanoparticles," *Chemphyschem.* 5:331-334 (2001); CrosGagneux, A., et al., "Surface chemistry of InP quantum dots: A comprehensive study," *J. Am. Chem. Soc.* 132:18147-18157 (2010); Micic, O. I., et al., "Synthesis and characterization of InP, GaP, and $GaInP_2$ quantum dots," *J. Phys. Chem.* 99:7754-7759 (1995); Guzelian, A. A., et al., "Synthesis of size-selected, surface-passivated InP nanocrystals," *J. Phys. Chem.* 100: 7212-7219 (1996); Lucey, D. W., et al., "Monodispersed InP quantum dots prepared by colloidal chemistry in a non-coordinating solvent," *Chem. Mater.* 17:3754-3762 (2005); Lim, J., et al., "InP@ZnSeS, core@composition gradient shell quantum dots with enhanced stability," *Chem. Mater.* 23:4459-4463 (2011); and Zan, F., et al., "Experimental studies on blinking behavior of single InP/ZnS quantum dots: Effects of synthetic conditions and UV irradiation," *J. Phys. Chem. C* 116:394-3950 (2012).

In some embodiments, the core is a Group II-VI nanocrystal selected from the group consisting of ZnO, ZnSe, ZnS, ZnTe, CdO, CdSe, CdS, CdTe, HgO, HgSe, HgS, HgTe, perovskite, and $CuIn_xGa_{1-x}S_ySe_{2-y}$. In some embodiments, the core is a nanocrystal selected from the group consisting of ZnSe, ZnS, CdSe, and CdS.

In some embodiments, the at least one first core is a cadmium-containing nanostructure and an at least one second core is a Group II-VI nanostructure. In some embodiments, the second core is a Group II-VI nanocrystal selected from the group consisting of BN, BP, BAs, AlP, AlAs, AlSb, GaN, GaP, GaAs, GaSb, InN, InP, InAs, InSb, perovskite, and $CuIn_xGa_{1-x}S_ySe_{2-y}$. In some embodiments, the at least one second core is a InP nanocrystal.

In some embodiments, the core is doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, $CuInS_2$, $CuInSe_2$, AlP, AlAs, GaN, GaP, or GaAs.

In some embodiments, the core is purified before deposition of a shell. In some embodiments, the core is filtered to remove precipitate from the core solution.

In some embodiments, the core is subjected to an acid etching step before deposition of a shell.

In some embodiments, the diameter of the core is determined using quantum confinement. Quantum confinement in zero-dimensional nanocrystallites, such as quantum dots, arises from the spatial confinement of electrons within the crystallite boundary. Quantum confinement can be observed once the diameter of the material is of the same magnitude as the de Broglie wavelength of the wave function. The electronic and optical properties of nanoparticles deviate substantially from those of bulk materials. A particle behaves as if it were free when the confining dimension is large compared to the wavelength of the particle. During this state, the bandgap remains at its original energy due to a continuous energy state. However, as the confining dimension decreases and reaches a certain limit, typically in nanoscale, the energy spectrum becomes discrete. As a result, the bandgap becomes size-dependent.

Production of a Shell

In some embodiments, the nanostructures include a core and at least one shell. In some embodiments, the nanostructures include a core and at least two shells. The shell can, e.g., increase the quantum yield and/or stability of the nanostructures. In some embodiments, the core and the shell comprise different materials. In some embodiments, the nanostructure comprises shells of different shell material.

In some embodiments, shell material is deposited onto a core or a core/shell(s) that comprises a mixture of Group II and VI materials. In some embodiments, the shell material comprises at least two of a zinc source, a selenium source, a sulfur source, a tellurium source, and a cadmium source. In some embodiments, the shell material comprises two of a zinc source, a selenium source, a sulfur source, a tellurium source, and a cadmium source. In some embodiments, the shell material comprises three of a zinc source, a selenium source, a sulfur source, a tellurium source, and a cadmium source. In some embodiments, the shell for each population is selected from the group consisting of Group II-V elements and oxides thereof. In some embodiments, the shell material deposited is ZnS, ZnSe, ZnSSe, ZnTe, ZnTeS, or ZnTeSe. In some embodiments, the shell for each population is independently selected from the group consisting of ZnS, ZnSe, ZnSSe, ZnTe, ZnTeS, or ZnTeSe. In other embodiments, alloyed shells containing low levels of cadmium can also be used.

The thickness of the shell can be controlled by varying the amount of precursor provided. For a given shell thickness, at least one of the precursors is optionally provided in an amount whereby, when a growth reaction is substantially complete, a shell of a predetermined thickness is obtained. If more than one different precursor is provided, either the amount of each precursor can be limited or one of the precursors can be provided in a limiting amount while others are provided in excess.

The thickness of each shell can be determined using techniques known to those of skill in the art. In some embodiments, the thickness of each shell is determined by comparing the average diameter of the nanostructure before and after the addition of each shell. In some embodiments, the average diameter of the nanostructure before and after the addition of each shell is determined by transmission electron microscopy. In some embodiments, each shell has a thickness of between 0.05 nm and 3.5 nm, between 0.05 nm and 2 nm, between 0.05 nm and 1 nm, between 0.05 nm and 0.5 nm, between 0.05 nm and 0.3 nm, between 0.05 nm and 0.1 nm, between 0.1 nm and 3.5 nm, between 0.1 nm and 2 nm, between 0.1 nm and 1 nm, between 0.1 nm and 0.5 nm, between 0.1 nm and 0.3 nm, between 0.3 nm and 3.5 nm, between 0.3 nm and 2 nm, between 0.3 nm and 1 nm, between 0.3 nm and 0.5 nm, between 0.5 nm and 3.5 nm, between 0.5 nm and 2 nm, between 0.5 nm and 1 nm, between 1 nm and 3.5 nm, between 1 nm and 2 nm, or between 2 nm and 3.5 nm.

In some embodiments, each shell is synthesized in the presence of at least one nanostructure ligand. Ligands can, e.g., enhance the miscibility of nanostructures in solvents or polymers (allowing the nanostructures to be distributed throughout a composition such that the nanostructures do not aggregate together), increase quantum yield of nanostructures, and/or preserve nanostructure luminescence (e.g., when the nanostructures are incorporated into a matrix). In some embodiments, the ligand(s) for the core synthesis and for the shell synthesis are the same. In some embodiments, the ligand(s) for the core synthesis and for the shell synthesis are different. Following synthesis, any ligand on the surface of the nanostructures can be exchanged for a different ligand with other desirable properties. Examples of ligands are disclosed in U.S. Pat. Nos. 7,572,395, 8,143,703, 8,425,803, 8,563,133, 8,916,064, 9,005,480, 9,139,770, and 9,169,435, and in U.S. Patent Application Publication No. 2008/0118755.

Ligands suitable for the synthesis of a shell are known by those of skill in the art. In some embodiments, the ligand is a fatty acid selected from the group consisting of lauric acid, caproic acid, myristic acid, palmitic acid, stearic acid, and oleic acid. In some embodiments, fatty acid is oleic acid, methoxy ethoxy acetic acid, acetic acid, propionic acid, butyric acid, valeric acid, heptanoic acid, caprylic acid, capric acid, undecanoic acid, behenic acid, acrylic acid, methacrylic acid, but-2-enoic acid, but-3-enoic acid, pent-2-enoic acid, pent-4-enoic acid, hex-2-enoic acid, hex-3-enoic acid, hex-4-enoic acid, hex-5-enoic acid, hept-6-enoic acid, oct-2-enoic acid, dec-2-enoic acid, undec-10-enoic acid, dodec-5-enoic acid, gadoleic acid, erucic acid, linoleic acid, α-linolenic acid, calendic acid, eicosadienoic acid, eicosatrienoic acid, arachidonic acid, stearidonic acid, benzoic acid, para-toluic acid, ortho-toluic acid, meta-toluic acid, hydrocinnamic acid, naphthenic acid, cinnamic acid, para-toluenesulfonic acid, mercaptosuccinic acid, undecylic acid, thiogylcolic acid, anacardic acid, thioalkyl acid, decanoic acid, trans-2-octenoic acid, polyacrylic acid, trifluoroacetic acid, and mixtures thereof. In some embodiments, the ligand is an organic phosphine or an organic phosphine oxide selected from trioctylphosphine oxide (TOPO), trioctylphosphine (TOP), diphenylphosphine (DPP), triphenylphosphine oxide, and tributylphosphine oxide. In some embodiments, the ligand is an amine selected from the group consisting of dodecylamine, oleylamine, hexadecylamine, dioctylamine, and octadecylamine. In some embodiments, the ligand is tributylphosphine, oleic acid, or zinc oleate.

In some embodiments, each shell is produced in the presence of a mixture of ligands. In some embodiments, each layer of a shell is produced in the presence of a mixture comprising 2, 3, 4, 5, or 6 different ligands. In some embodiments, each shell is produced in the presence of a mixture comprising 3 different ligands. In some embodiments, the mixture of ligands comprises tributylphosphine, oleic acid, and zinc oleate.

In some embodiments, each shell is produced in the presence of a solvent. In some embodiments, the solvent is selected from the group consisting of 1-octadecene, 1-hexadecene, 1-eicosene, eicosane, octadecane, hexadecane, tetradecane, squalene, squalane, trioctylphosphine oxide, and dioctyl ether. In some embodiments, the solvent is 1-octadecene.

In some embodiments, a core or a core/shell(s) and shell materials are contacted at an addition temperature between 20° C. and 310° C., between 20° C. and 280° C., between 20° C. and 250° C., between 20° C. and 200° C., between 20° C. and 150° C., between 20° C. and 100° C., between 20° C. and 50° C., between 50° C. and 310° C., between 50° C. and 280° C., between 50° C. and 250° C., between 50° C. and 200° C., between 50° C. and 150° C., between 50° C. and 100° C., between 100° C. and 310° C., between 100° C. and 280° C., between 100° C. and 250° C., between 100° C. and 200° C., between 100° C. and 150° C., between 150° C. and 310° C., between 150° C. and 280° C., between 150° C. and 250° C., between 150° C. and 200° C., between 200° C. and 310° C., between 200° C. and 280° C., between 200° C. and 250° C., between 250° C. and 310° C., between 250° C. and 280° C., or between 280° C. and 310° C. In some embodiments, a core or a core/shell(s) and shell materials are contacted at an addition temperature between 20° C. and 100° C.

In some embodiments, after contacting a core or core/shell(s) and shell materials, the temperature of the reaction mixture is increased to an elevated temperature between 200° C. and 310° C., between 200° C. and 280° C., between 200° C. and 250° C., between 200° C. and 220° C., between 220° C. and 310° C., between 220° C. and 280° C., between 220° C. and 250° C., between 250° C. and 310° C., between 250° C. and 280° C., or between 280° C. and 310° C. In some embodiments, after contacting a core or core/shell(s) and shell materials, the temperature of the reaction mixture is increased to between 250° C. and 310° C.

In some embodiments, after contacting a core or core/shell(s) and shell materials, the time for the temperature to reach the elevated temperature is between 2 and 240 minutes, between 2 and 200 minutes, between 2 and 100 minutes, between 2 and 60 minutes, between 2 and 40 minutes, between 5 and 240 minutes, between 5 and 200 minutes, between 5 and 100 minutes, between 5 and 60 minutes, between 5 and 40 minutes, between 10 and 240 minutes, between 10 and 200 minutes, between 10 and 100 minutes, between 10 and 60 minutes, between 10 and 40 minutes, between 40 and 240 minutes, between 40 and 200 minutes, between 40 and 100 minutes, between 40 and 60 minutes, between 60 and 240 minutes, between 60 and 200 minutes, between 60 and 100 minutes, between 100 and 240 minutes, between 100 and 200 minutes, or between 200 and 240 minutes.

In some embodiments, after contacting a core or core/shell(s) and shell materials, the temperature of the reaction mixture is maintained at an elevated temperature for between 2 and 240 minutes, between 2 and 200 minutes, between 2 and 100 minutes, between 2 and 60 minutes, between 2 and 40 minutes, between 5 and 240 minutes, between 5 and 200 minutes, between 5 and 100 minutes, between 5 and 60 minutes, between 5 and 40 minutes, between 10 and 240 minutes, between 10 and 200 minutes, between 10 and 100 minutes, between 10 and 60 minutes, between 10 and 40 minutes, between 40 and 240 minutes, between 40 and 200 minutes, between 40 and 100 minutes, between 40 and 60 minutes, between 60 and 240 minutes, between 60 and 200 minutes, between 60 and 100 minutes, between 100 and 240 minutes, between 100 and 200 minutes, or between 200 and 240 minutes. In some embodiments, after contacting a core or core/shell(s) and shell materials, the temperature of the reaction mixture is maintained at an elevated temperature for between 30 and 120 minutes.

In some embodiments, additional shells are produced by further additions of shell material precursors that are added to the reaction mixture followed by maintaining at an elevated temperature. Typically, additional precursor is provided after reaction of the previous shell is substantially complete (e.g., when at least one of the previous precursors is depleted or removed from the reaction or when no additional growth is detectable). The further additions of precursor create additional shells.

In some embodiments, the nanostructure is cooled before the addition of additional shell material precursor to provide further shells. In some embodiments, the nanostructure is maintained at an elevated temperature before the addition of shell material precursor to provide further shells.

After sufficient layers of shell have been added for the nanostructure to reach the desired thickness and diameter, the nanostructure can be cooled. In some embodiments, the core/shell(s) nanostructures are cooled to room temperature. In some embodiments, an organic solvent is added to dilute the reaction mixture comprising the core/shell(s) nanostructures.

In some embodiments, the organic solvent used to dilute the reaction mixture is ethanol, hexane, pentane, toluene, benzene, diethylether, acetone, ethyl acetate, dichloromethane (methylene chloride), chloroform, dimethylformamide, or N-methylpyrrolidinone. In some embodiments, the organic solvent is toluene.

In some embodiments, the core/shell(s) nanostructures are isolated by precipitation using an organic solvent. In some embodiments, the core/shell(s) nanostructures are isolated by flocculation with ethanol.

Production of a ZnSe Shell

In some embodiments, the shell deposited onto the core or core/shell(s) nanostructure is a ZnSe shell.

In some embodiments, the shell materials contacted with a core or core/shell(s) nanostructure to prepare a ZnSe shell comprise a zinc source and a selenium source.

In some embodiments, the zinc source is a dialkyl zinc compound. In some embodiments, the zinc source is a zinc carboxylate. In some embodiments, the zinc source is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source is zinc oleate, zinc hexanoate, zinc octanoate, zinc laurate, zinc myristate, zinc palmitate, zinc stearate, zinc dithiocarbamate, zinc methoxy ethoxy acetate, zinc caprylate, zinc caprate, zinc mercaptosuccinate, zinc decanoate, zinc undecylenate, zinc diethyldithiocarbamate, zinc dibenzyldithiocarbamate, zinc dioleate, or mixtures thereof. In some embodiments, the zinc source is zinc oleate.

In some embodiment, the zinc carboxylate is produced by reacting a zinc salt with a carboxylic acid. In some embodiments, the carboxylic acid is selected from acetic acid, propionic acid, butyric acid, valeric acid, caproic acid, heptanoic acid, caprylic acid, capric acid, undecanoic acid, lauric acid, myristic acid, palmitic acid, stearic acid, behenic acid, acrylic acid, methacrylic acid, but-2-enoic acid, but-3-enoic acid, pent-2-enoic acid, pent-4-enoic acid, hex-2-enoic acid, hex-3-enoic acid, hex-4-enoic acid, hex-5-enoic acid, hept-6-enoic acid, oct-2-enoic acid, dec-2-enoic acid, undec-10-enoic acid, dodec-5-enoic acid, oleic acid, gadoleic acid, erucic acid, linoleic acid, α-linolenic acid, calendic acid, eicosadienoic acid, eicosatrienoic acid, arachidonic acid, stearidonic acid, benzoic acid, para-toluic acid, ortho-toluic acid, meta-toluic acid, hydrocinnamic acid, naphthenic acid, cinnamic acid, para-toluenesulfonic acid, and mixtures thereof.

In some embodiments, the use of carboxylate ligands in the matrix composition improves the stability of optical films containing diverse types of nanostructures. The use of zinc carboxylates in the matrix composition contributes to the stability of the optical films with the following characteristics: (i) stable valence state (weak oxidizing and reducing ability), (ii) weak reactivity with phosphorus and low affinity for lattice doping of InP, (iii) low melting point, (iv) high thermal stability at reaction temperature, and (v) non-toxicity and easy handling. See Xu, S., et al., *J. Mater. Chem.* 18:2653-2656 (2008).

In some embodiments, the selenium source is an alkyl-substituted selenourea. In some embodiments, the selenium source is a phosphine selenide. In some embodiments, the selenium source is selected from trioctylphosphine selenide, tri(n-butyl)phosphine selenide, tri(sec-butyl)phosphine selenide, tri(tert-butyl)phosphine selenide, trimethylphosphine selenide, triphenylphosphine selenide, diphenylphosphine selenide, phenylphosphine selenide, tricyclohexylphosphine selenide, cyclohexylphosphine selenide, 1-octaneselenol, 1-dodecaneselenol, selenophenol, elemental selenium, hydrogen selenide, bis(trimethylsilyl) selenide, selenourea, and mixtures thereof. In some embodiments, the selenium source is tri(n-butyl)phosphine selenide, tri(sec-butyl)phosphine selenide, or tri(tert-butyl)phosphine selenide. In some embodiments, the selenium source is trioctylphosphine selenide.

In some embodiments, each ZnSe shell has a thickness of between 0.2 nm and 3.5 nm, between 0.2 nm and 2 nm, between 0.2 nm and 1 nm, between 0.2 nm and 0.5 nm, between 0.4 nm and 3.5 nm, between 0.4 nm and 2 nm, between 0.4 nm and 1 nm, between 0.6 nm and 3.5 nm, between 0.6 nm and 2 nm, between 0.6 nm and 1 nm, between 0.8 nm and 3.5 nm, between 0.8 nm and 2 nm, between 0.8 nm and 1 nm, between 1 nm and 3.5 nm, between 1 nm and 2 nm, or between 2 nm and 3.5 nm.

Production of a ZnS Shell

In some embodiments, the shell deposited onto the core or core/shell(s) nanostructure is a ZnS shell.

In some embodiments, the shell materials contacted with a core or core/shell(s) nanostructure to prepare a ZnS shell comprise a zinc source and a sulfur source.

In some embodiments, the ZnS shell passivates defects at the particle surface, which leads to an improvement in the quantum yield and to higher efficiencies when used in devices such as LEDs and lasers. Furthermore, spectral impurities which are caused by defect states may be eliminated by passivation, which increases the color saturation.

In some embodiments, the zinc source is a dialkyl zinc compound. In some embodiments, the zinc source is a zinc carboxylate. In some embodiments, the zinc source is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source is zinc oleate, zinc hexanoate, zinc octanoate, zinc laurate, zinc myristate, zinc palmitate, zinc stearate, zinc dithiocarbamate, zinc methoxy ethoxy acetate, zinc caprylate, zinc caprate, zinc mercaptosuccinate, zinc decanoate, zinc undecylenate, zinc diethyldithiocarbamate, zinc dibenzyldithiocarbamate, zinc dioleate or mixtures thereof. In some embodiments, the zinc source is zinc oleate.

In some embodiments, the zinc source is produced by reacting a zinc salt with a carboxylic acid. In some embodiments, the carboxylic acid is selected from acetic acid, propionic acid, butyric acid, valeric acid, caproic acid, heptanoic acid, caprylic acid, capric acid, undecanoic acid, lauric acid, myristic acid, palmitic acid, stearic acid, behenic acid, acrylic acid, methacrylic acid, but-2-enoic acid, but-3-enoic acid, pent-2-enoic acid, pent-4-enoic acid, hex-2-enoic acid, hex-3-enoic acid, hex-4-enoic acid, hex-5-enoic acid, hept-6-enoic acid, oct-2-enoic acid, dec-2-enoic acid, undec-10-enoic acid, dodec-5-enoic acid, oleic acid, gadoleic acid, erucic acid, linoleic acid, α-linolenic acid, calendic acid, eicosadienoic acid, eicosatrienoic acid, arachidonic acid, stearidonic acid, benzoic acid, para-toluic acid, ortho-toluic acid, meta-toluic acid, hydrocinnamic acid, naphthenic acid, cinnamic acid, para-toluenesulfonic acid, and mixtures thereof.

The use of carboxylate ligands in the composition improves the stability of optical films containing diverse types of nanostructures. The use of zinc carboxylates in the composition contributes to the stability of the optical films with the following characteristics: (i) stable valence state (weak oxidizing and reducing ability), (ii) weak reactivity with phosphorus and low affinity for lattice doping of InP, (iii) low melting point, (iv) high thermal stability at reaction temperature, and (v) non-toxicity and easy handling. See Xu, S., et al., *J. Mater. Chem.* 18:2653-2656 (2008).

In some embodiments, the sulfur source is selected from elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, and mixtures thereof. In some embodiments, the sulfur source is an alkyl-substituted zinc dithiocarbamate. In some embodiments, the sulfur source is octanethiol.

In some embodiments, each ZnS shell has a thickness of between 0.2 nm and 3.5 nm, between 0.2 nm and 2 nm, between 0.2 nm and 1 nm, between 0.2 nm and 0.5 nm, between 0.4 nm and 3.5 nm, between 0.4 nm and 2 nm, between 0.4 nm and 1 nm, between 0.6 nm and 3.5 nm, between 0.6 nm and 2 nm, between 0.6 nm and 1 nm, between 0.8 nm and 3.5 nm, between 0.8 nm and 2 nm, between 0.8 nm and 1 nm, between 1 nm and 3.5 nm, between 1 nm and 2 nm, or between 2 nm and 3.5 nm.

Core/Shell(s) Nanostructures

In some embodiments, the core/shell(s) nanostructure is a core/ZnSe/ZnS nanostructure. In some embodiments, the core/shell(s) nanostructure is a CdSe/ZnSe/ZnS nanostructure or a InP/ZnSe/ZnS nanostructure.

In some embodiments, the core/shell(s) nanostructures display a high photoluminescence quantum yield. In some embodiments, the core/shell(s) nanostructures display a photoluminescence quantum yield of between 60% and 99%, between 60% and 95%, between 60% and 90%, between 60% and 85%, between 60% and 80%, between 60% and 70%, between 70% and 99%, between 70% and 95%, between 70% and 90%, between 70% and 85%, between 70% and 80%, between 80% and 99%, between 80% and 95%, between 80% to 90%, between 80% and 85%, between 85% and 99%, between 85% and 95%, between 80% and 85%, between 85% and 99%, between 85% and 90%, between 90% and 99%, between 90% and 95%, or between 95% and 99%. In some embodiments, the core/shell(s) nanostructures display a photoluminescence quantum yield of between 85% and 96%.

The photoluminescence spectrum of the core/shell(s) nanostructures can cover essentially any desired portion of the spectrum. In some embodiments, the photoluminescence spectrum for the core/shell(s) nanostructures have a emission maximum between 300 nm and 750 nm, between 300 nm and 650 nm, between 300 nm and 550 nm, between 300 nm and 450 nm, between 450 nm and 750 nm, between 450 nm and 650 nm, between 450 nm and 550 nm, between 450 nm and 750 nm, between 450 nm and 650 nm, between 450 nm and 550 nm, between 550 nm and 750 nm, between 550 nm and 650 nm, or between 650 nm and 750 nm. In some embodiments, the photoluminescence spectrum for the core/shell(s) nanostructures has an emission maximum of between 500 nm and 550 nm. In some embodiments, the photoluminescence spectrum for the core/shell(s) nanostructures has an emission maximum of between 600 nm and 650 nm.

The size distribution of the core/shell(s) nanostructures can be relatively narrow. In some embodiments, the photoluminescence spectrum of the population or core/shell(s) nanostructures can have a full width at half maximum of between 10 nm and 60 nm, between 10 nm and 40 nm, between 10 nm and 30 nm, between 10 nm and 20 nm, between 20 nm and 60 nm, between 20 nm and 40 nm, between 20 nm and 30 nm, between 30 nm and 60 nm, between 30 nm and 40 nm, or between 40 nm and 60 nm. In some embodiments, the photoluminescence spectrum of the population or core/shell(s) nanostructures can have a full width at half maximum of between 35 nm and 45 nm.

In some embodiments, the core/shell(s) nanostructures are able to maintain high levels of photoluminescence intensity for long periods of time under continuous blue light exposure. In some embodiments, the core/shell(s) nanostructures are able to maintain 90% intensity (compared to the starting intensity level) of at least 2,000 hours, at least 4,000 hours, at least 6,000 hours, at least 8,000 hours, or at least 10,000 hours. In some embodiments, the core/shell(s) nanostructures are able to maintain 80% intensity (compared to the starting intensity level) of at least 2,000 hours, at least 4,000 hours, at least 6,000 hours, at least 8,000 hours, or at least 10,000 hours. In some embodiments, the core/shell(s) nanostructures are able to maintain 70% intensity (compared to the starting intensity level) of at least 2,000 hours, at least 4,000 hours, at least 6,000 hours, at least 8,000 hours, or at least 10,000 hours.

The relative molar ratios of core, ZnSe, and ZnS are calculated based on a spherical core of a given diameter by measuring the volumes, masses, and thus molar amounts of the desired spherical shells. For example, a green InP core of 1.8 nm diameter coated with ZnSe and ZnS requires 9.2 molar equivalents of ZnSe and 42.8 molar equivalents of ZnS relative to the molar amount of InP bound in the cores. This shell structure results in a total particle diameter of 6.23 nm. A green InP core of 1.8 nm diameter coated with ZnSe and ZnS provides a particle size with a measured mean particle diameter of 5.9 nm.

The nanostructures further comprise a ligand bound thereto. In some embodiments, the ligand is a carboxylate ligand. In some embodiments, the ligand is a fatty acid. In some embodiments, the fatty acid is oleic acid, lauric acid, or methoxy ethoxy acetic acid. In another embodiment, the ligand is a fatty acid selected from the group consisting of lauric acid, caproic acid, myristic acid, palmitic acid, stearic acid, and oleic acid.

In some embodiments, fatty acid is selected from the group consisting of one or more carboxyl functionalized groups having carbon atoms between $C_2$-$C_{40}$, such as acetic acid, propionic acid, butyric acid, valeric acid, caproic acid, heptanoic acid, caprylic acid, capric acid, undecanoic acid, lauric acid, myristic acid, palmitic acid, stearic acid, behenic acid, acrylic acid, methacrylic acid, but-2-enoic acid, but-3-enoic acid, pent-2-enoic acid, pent-4-enoic acid, hex-2-enoic acid, hex-3-enoic acid, hex-4-enoic acid, hex-5-enoic acid, hept-6-enoic acid, oct-2-enoic acid, dec-2-enoic acid, undec-10-enoic acid, dodec-5-enoic acid, oleic acid, gadoleic acid, erucic acid, linoleic acid, α-linolenic acid, calendic acid, eicosadienoic acid, eicosatrienoic acid, arachidonic acid, stearidonic acid, benzoic acid, para-toluic acid, ortho-toluic acid, meta-toluic acid, hydrocinnamic acid, naphthenic acid, cinnamic acid, para-toluenesulfonic acid, mercaptosuccinic acid, undecylic acid, thiogylcolic acid, anacardic acid, thioalkyl acid, decanoic acid, trans-2-octenoic acid, polyacrylic acid, trifluoroacetic acid, and mixtures thereof.

In some embodiments, the carboxylate ligand is zinc carboxylate. In another embodiment, the zinc carboxylate is a zinc salt of oleic acid, lauric acid, or methoxy ethoxy acetic acid. In another embodiment, the zinc carboxylate is zinc acetate, zinc acetylacetonate, zinc hexanoate, zinc octanoate, zinc stearate, zinc myristate, zinc palmitate, zinc caprylate, zinc caprate, zinc mercaptosuccinate, zinc decanoate, zinc undecylenate, zinc diethyldithiocarbamate, zinc dibenzyldithiocarbamate, zinc dioleate, zinc dithiocarbamate, or mixtures thereof. In another embodiment, the zinc carboxylate is produced by reacting a zinc salt with a carboxylic acid. In some embodiments, the carboxylic acid is selected from acetic acid, propionic acid, butyric acid, valeric acid, caproic acid, heptanoic acid, caprylic acid, capric acid, undecanoic acid, lauric acid, myristic acid, palmitic acid, stearic acid, behenic acid, acrylic acid, methacrylic acid, but-2-enoic acid, but-3-enoic acid, pent-2-enoic acid, pent- 4-enoic acid, hex-2-enoic acid, hex-3-enoic acid, hex-4-enoic acid, hex-5-enoic acid, hept-6-enoic acid, oct-2-enoic acid, dec-2-enoic acid, undec-10-enoic acid, dodec-5-enoic acid, oleic acid, gadoleic acid, erucic acid, linoleic acid, α-linolenic acid, calendic acid, eicosadienoic acid, eicosatrienoic acid, arachidonic acid, stearidonic acid, benzoic acid, para-toluic acid, ortho-toluic acid, meta-toluic acid, hydrocinnamic acid, naphthenic acid, cinnamic acid, para-toluenesulfonic acid, and mixtures thereof.

The use of carboxylate ligands in the composition improves the stability of optical films containing diverse types of nanostructures. The use of zinc carboxylates in the composition contributes to the stability of the optical films with the following characteristics: (i) stable valence state (weak oxidizing and reducing ability), (ii) weak reactivity with phosphorus and low affinity for lattice doping of InP, (iii) low melting point, (iv) high thermal stability at reaction temperature, and (v) non-toxicity and easy handling. See Xu, S., et al., *J. Mater. Chem.* 18:2653-2656 (2008).

Coating the Nanostructures with an Oxide Material

Regardless of their composition, most quantum dots do not retain their originally high quantum yield after continuous exposure to excitation photons. Although the use of thick shells may prove effective in mitigating the effects of photoinduced quantum yield deterioration, the photodegradation of quantum dots may be further retarded by encasing them with an oxide. Coating quantum dots with an oxide causes their surface to become physically isolated from their environments.

Coating quantum dots with an oxide material has been shown to increase their photostability. In Jo, J.-H., et al., *J. Alloys & Compounds* 647:6-13 (2015), InP/ZnS red-emitting quantum dots were overcoated with an oxide phase of $In_2O_3$ which was found to substantially alleviate quantum dot photodegradation as shown by comparative photostability results.

In some embodiments, the nanostructures are coated with an oxide material for increased stability. In some embodiments, the oxide material is $In_2O_3$, $SiO_2$, $Al_2O_3$, or $TiO_2$.

Nanostructures in a Common Matrix Material

Suitable common matrix materials are chemically and optically compatible with nanostructures and any surrounding packaging materials or layers used in applying a nanostructure film to devices. Suitable matrix materials include non-yellowing optical materials that are transparent to both the primary and secondary light, thereby allowing for both primary and secondary light to transmit through the matrix material. Matrix materials can include polymers and organic and inorganic oxides. Suitable polymers for use in the matrix material can be any polymer known to the ordinarily skilled artisan that can be used for such a purpose. The polymer can be substantially translucent or substantially transparent. Matrix materials include, but not limited to, epoxies, acrylates, norbornene, polyethylene, poly(vinyl butyral):poly (vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); thiol-functionalized polymers or polythiol-functionalized polymers that can be cross-linked with an isocyanate, an epoxy, or an unsaturated compound under UV curing conditions;

polymers that are cross-linked with bifunctional monomers, such as divinylbenzene; cross-linkers suitable for cross-linking ligand materials, epoxides that combine with ligand amines (e.g., APS or polyethylene imine ligand amines) to form epoxy, and the like. In some embodiments, the matrix material comprises thiol-functionalized or polythiol-functionalized polymers.

In some embodiments, the matrix material comprises scattering microbeads such as $TiO_2$ microbeads, ZnS microbeads, or glass microbeads that can improve photo conversion efficiency of the nanostructure film. In some embodiments, the matrix material comprises light blocking elements.

In some embodiments, the matrix material can have low oxygen and moisture permeability, exhibit high photo- and chemical-stability, exhibit favorable refractive indices, and adhere to outer surfaces of the nanostructures, thus providing an air-tight seal to protect the nanostructures. In another embodiment, the matrix material is curable with UV or thermal curing methods to facilitate roll-to-roll processing.

Films, Devices and Uses

The at least one first and second populations of nanostructures are embedded in a matrix that forms a film (e.g., an organic polymer, silicon-containing polymer, inorganic, glassy, and/or other matrix). This film may be used in production of a nanostructure phosphor, and/or incorporated into a device, e.g., an LED, backlight, downlight, or other display or lighting unit or an optical filter. Exemplary phosphors and lighting units can, e.g., generate a specific color light by incorporating a population of nanostructures with an emission maximum at or near the desired wavelength or a wide color gamut by incorporating two or more different populations of nanostructures having different emission maxima. A variety of suitable matrices are known in the art. See, e.g., U.S. Pat. No. 7,068,898 and U.S. Patent Application Publication Nos. 2010/0276638, 2007/0034833, and 2012/0113672. Exemplary nanostructure phosphor films, LEDs, backlighting units, etc. are described, e.g., in U.S. Patent Application Publications Nos. 2010/0276638, 2012/0113672, 2008/0237540, 2010/0110728, and 2010/0155749 and U.S. Pat. Nos. 7,374,807, 7,645,397, 6,501, 091, and 6,803,719.

In some embodiments, the optical films containing nanostructure compositions are substantially free of cadmium. As used herein, the term "substantially free of cadmium" is intended that the nanostructure compositions contain less than 100 ppm by weight of cadmium. The RoHS compliance definition requires that there must be no more than 0.01% (100 ppm) by weight of cadmium in the raw homogeneous precursor materials. The cadmium concentration can be measured by inductively coupled plasma mass spectroscopy (ICP-MS) analysis, and are on the parts per billion (ppb) level. In some embodiments, optical films that are "substantially free of cadmium" contain 10 to 90 ppm cadmium. In other embodiment, optical films that are substantially free of cadmium contain less than about 50 ppm, less than about 20 ppm, less than about 10 ppm, or less than about 1 ppm of cadmium.

In one embodiment, the at least one first population of cadmium-containing core-shell nanostructures and the at least one second population of core-shell nanostructures are combined with a matrix and manufactured into an optical film. The optical film may be used in a commercial display to give a Rec.2020 color gamut of at least 80% and RoHS compliance. In another embodiment, the Rec.2020 color gamut of the optical film is about 85-98%.

The "gamut coverage" of a film or display is the percentage of a color gamut that the film or display is capable of rendering, measured as an area in the 1976 CIE(u',v') color space. FIG. 2 shows the Rec.2020 color gamut as solid triangle 20 in the 1976 CIE(u',v') color space.

A display can render any color inside the polygon defined by the CIE coordinates of its pixels in a color space. For a display with red (R), green (G) and blue (B) pixels, the CIE coordinates (u'R, v'R), (u'G, v'G), and (u'B, v'B) of those pixels, represented by points 21, 22 and 23 of FIG. 2, respectively, define triangle 25. The display can render any color along the edges or within the interior of triangle 25. Shaded area 26 is the overlap between the Rec.2020 color gamut and the colors that the display is capable of rendering. The gamut coverage of the display is this shaded area 26 divided by the area of solid triangle 20.

Gamut coverage is sometimes calculated using other color spaces, most frequently 1931 CIE color space. As used in this application, "gamut coverage" refers to a calculation performed using the 1976 CIE(u',v') color space, which provides a more consistent correlation across different colors between area in color space and the ability of the human eye to distinguish color. A definition of gamut coverage may be found at www.eizo.com/library/basics/lcd_monitor_color-_gamut/. See also, "Information Display Measurements Standard version 1.03" published by the International Committee for Display Metrology (ICDM), in section 5.18 and appendix B29. See also www.icdm-sid.org. The gamut coverage of an optical film of the present invention is determined using the color filter of Vizio P652UI-B2.

In some embodiments, the invention provides an optical film for use in a display device having less than 100 ppm of cadmium and comprising at least one population of cadmium-containing core-shell quantum dots in a matrix material having a FWHM less than about 40 nm, and a quantum efficiency greater than 90%, and the device comprising the optical film capable of achieving a Rec.2020 coverage of at least 85%. In some embodiments, the FWHM is 20-40 nm. In another embodiment, the FWHM is less than or equal to 30 nm. In some embodiments, the quantum yield is about 85%-about 98%. In another embodiment, the quantum yield is greater than about 85%, greater than about 90%, greater than about 95%, or about 98%. In another embodiment, the film further comprises at least one second population of non-cadmium containing core-shell quantum dots in the matrix material. In another embodiment, the at least second population of core-shell quantum dots comprises an InP core. In another embodiment, the display device comprising the optical film is capable of achieving a Rec.2020 coverage of greater than about 90%. In another embodiment, the first population of core-shell quantum dots have a FWHM of less than about 30 nm. In another embodiment, the second population of core-shell quantum dots have a FWHM of less than about 45 nm. In another embodiment, the second population of core-shell quantum dots have a quantum efficiency of greater than about 70%, e.g., greater than about 75%, e.g., greater than about 78%. In another embodiment, the first population of core-shell quantum dots are CdSe/ZnSe/ZnS and the at least one second population of core-shell quantum dots is InP/ZnSe/ZnS.

The invention also provides a display device comprising:
(a) a layer that emits radiation;
(b) an optical film layer comprising the at least one first and second populations of nanostructures, disposed on the radiation emitting layer;
(c) an optically transparent barrier layer on the optical film layer; and (d) an optical element, disposed on the barrier layer.

In some embodiments, the radiation emitting layer, the optical film layer, and the optical element are part of a pixel unit of the display device. In another embodiment, the optical element is a color filter. In another embodiment, the barrier layer comprises an oxide. In another embodiment, the film layer further comprises surfactants or ligands bonded to the optically transparent barrier layer. In another embodiment, the optically transparent barrier layer is configured to protect the nanostructure from degradation by light flux, heat, oxygen, moisture, or a combination thereof.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

The following an examples demonstrating the preparation of optical films and display devices having low levels of cadmium and high color gamut.

Example 1

Figure 1:
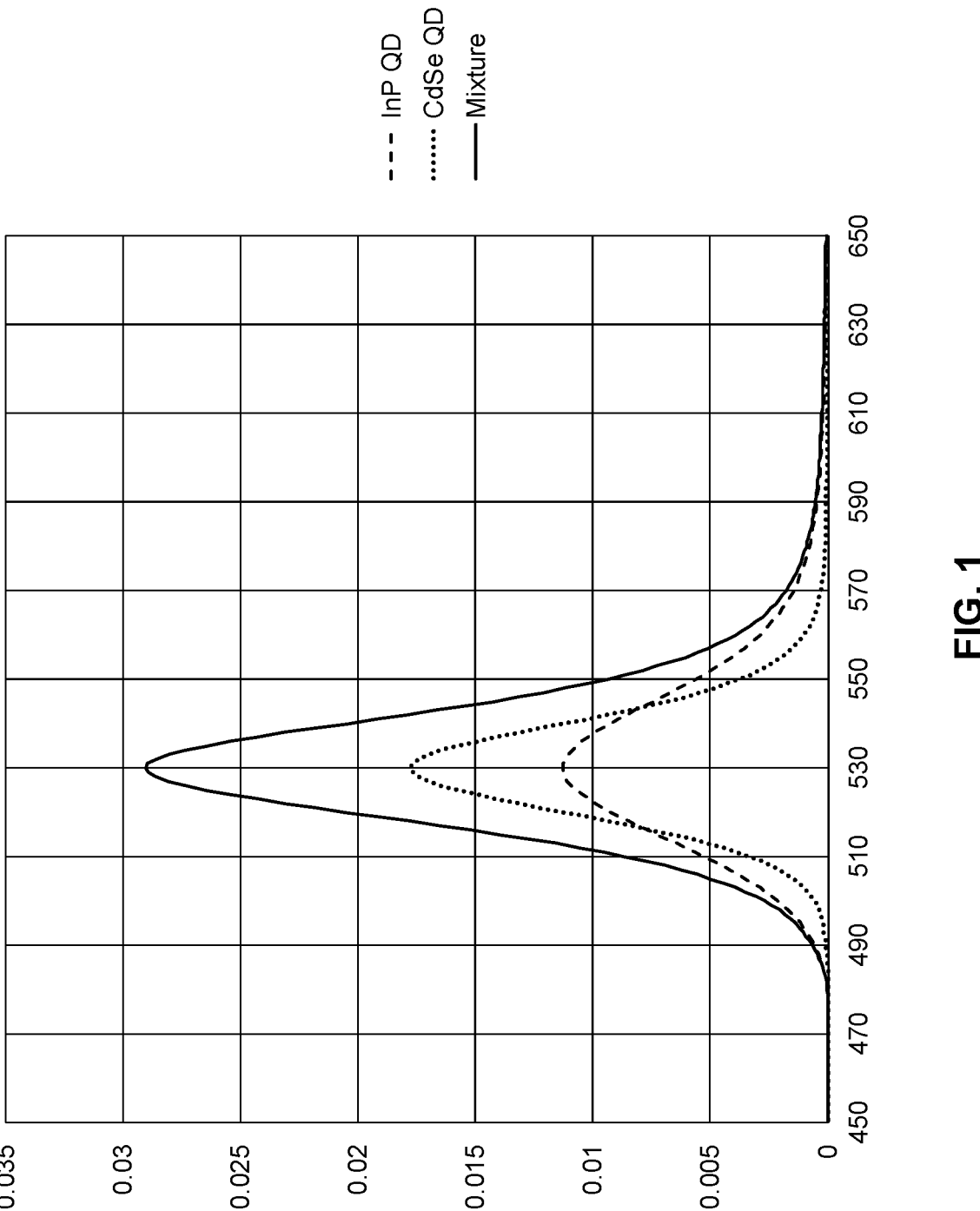
FIG. 1 depicts a line graph of a modeling the emission spectra of InP quantum dots (InP QD), CdSe quantum dots (CdSe QD), and a 50:50 emission intensity combination of InP and CdSe quantum dots (Mixture). The QDs had a peak wavelength of 530 nm. The CdSe QDs had a FWHM of 25 nm while the InP QDs had a FWHM of 39 nm. The resultant mixture had a FWHM of 29.4 nm.

The QDs in this example had a peak wavelength of 530 nm. The green-emitting CdSe QDs had a FWHM of 25 nm while the red-emitting InP QDs had a FWHM of 39 nm. The resultant mixture of both quantum dots had a FWHM of 29.4 nm. See FIG. 1.

Example 2

Combinations of green- and red-emitting QDs having 50/50 emission intensities along with a single-type QD, the relative brightness for QDEF achieving 80% BT2020 gamut coverage, were modeled via a color filter. The color filters (Table 1) for the Vizio 2020 PX TV were used along with a nominal blue LED (450 nm peak, 20 nm FWHM). For these particular color filters, the optimal green peak wavelength for color gamut coverage was also the optimal wavelength for brightness so that value was used for all conditions.

In the case of a QDEF comprising red InP and green CdSe QDs where the cadmium content exceeds the ROHS limit, combining red InP QDs with a green mixture of InP and CdSe QDs having 50/50 emission intensities resulted in an 8% increase in relative brightness compared with a fully InP QDEF at 80% BT2020 color gamut coverage (Table 1).

In the case of a QDEF comprising red InP and green CdSe QDs where the cadmium content is well below the ROHS limit, a combination of green CdSe QDs with a red mixture of InP and CdSe QDs having 50/50 emission intensities exhibited a 5% increase in relative brightness compared with a combination of InP and CdSe QDs, and a 19% increase in relative brightness compared with a fully InP QDEF (Table 1).

TABLE 1

| | Red PWL (nm) | Red FWHM (nm) | Green PWL (nm) | Green FWHM (nm) | Relative Brightness |
|---|---|---|---|---|---|
| InP | 646 | 42 | 539 | 39 | 100% |
| CdSe and InP | 634.6 | 42 | 539 | 25 | 113% |

TABLE 1-continued

| | Red PWL (nm) | Red FWHM (nm) | Green PWL (nm) | Green FWHM (nm) | Relative Brightness |
|---|---|---|---|---|---|
| Green 50/50 and Red InP | 639.4 | 42 | 539 | 29.4 | 108% |
| Red 50/50 and Green CdSe | 631.2 | 30.7 | 539 | 25 | 119% |

Most importantly, the QDEF made with the QDs described herein have cadmium content of less than 100 ppm, which is in full compliance to ROHS (See, www.rohsguide.com/rohs-substances.htm).

Having now fully described this invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference herein in their entirety.

What is claimed is:

1. An optical film useful in a display device comprising a first population of cadmium-containing core-shell nanostructures and a second population of core-shell nanostructures that are not cadmium-containing core-shell nanostructures in a common matrix material; wherein a peak emission wavelength of the first population is within ±10 nanometers of the peak emission wavelength of the second population, and further comprising a third population of nanostructures with a different peak emission wavelength.

2. The optical film of claim 1, wherein the optical film comprises 10 to 99 ppm of cadmium.

3. The optical film of claim 1, wherein the second population of nanostructures has a core selected from the group consisting of ZnO, ZnSe, ZnS, ZnTe, HgO, HgSe, HgS, HgTe, BN, BP, BAs, AlN, AlP, AlAs, AlSb, GaN, GaP, GaAs, GaSb, InN, InP, InAs, InSb, perovskite, and $CuIn_xGa_{1-x}SySe_{2-y}$.

4. The optical film of claim 1, wherein the first population of core-shell nanostructures are CdSe/ZnSe/ZnS and the second population of core-shell nanostructures are InP/ZnSe/ZnS.

5. The optical film of claim 1, wherein the emission spectra of each of the first, second, and third populations of core-shell nanostructures has a full width at half maximum of 10 to 50 nanometers.

6. The optical film of claim 1, wherein the optical film is capable of achieving a Rec.2020 coverage of greater than 90% in a display device.

7. The optical film of claim 1, comprising a first population of cadmium-containing core-shell nanostructures with a full width at half maximum of 20 to 40 nanometers, and a quantum yield of greater than about 90%.

8. The optical film of claim 1, comprising a second population of non-cadmium-containing core-shell nanostructures with a full width at half maximum of 20 to 45 nanometers, and a quantum yield of greater than about-75%.

9. The optical film of claim 1, wherein the peak emission wavelengths of the first and second populations are the same.

10. The optical film of claim 1, wherein the third population of nanostructures are either CdSe or InP nanostructures.

11. The optical film of claim 1, wherein the peak emission wavelengths of the first and second population of nanostructures are at 539 nm, and the peak emission wavelength of the third population of nanostructures is at 639 nm.

12. The optical film of claim 1, wherein the peak emission wavelengths of the first and second population of nanostructures are at 639 nm, and the peak emission wavelength of the third population of nanostructures is at 539 nm.

13. The optical film of claim 1, wherein the matrix material comprises of thiol-functionalized or polythiol-functionalized polymers.

14. The optical film of claim 1, wherein the nanostructures further comprise a ligand bound thereto.

15. A display device, comprising the optical film of claim 1.

16. The display device of claim 15, having a Rec.2020 coverage of 90 to 98%.

17. The display device of claim 15, comprising:

a layer that emits radiation;

the optical film layer disposed on the radiation emitting layer;

an optically transparent barrier layer on the film layer; and an optical element, disposed on the barrier layer.

18. The display device of claim 17, wherein the radiation emitting layer, the film layer, and the optical element are part of a pixel unit of the display device.

19. The display device of claim 17, wherein the optical element is a color filter.

20. The display device of claim 17, wherein the optically transparent barrier layer is configured to protect the nanostructures from degradation by light flux, heat, oxygen, moisture, or a combination thereof.

\* \* \* \* \*